US010654173B2

(12) United States Patent
Fujikawa

(10) Patent No.: US 10,654,173 B2
(45) Date of Patent: May 19, 2020

(54) FORCE DETECTION APPARATUS AND ROBOT

(71) Applicant: Seiko Epson Corporation, Tokyo (JP)

(72) Inventor: Kohei Fujikawa, Matsumoto (JP)

(73) Assignee: Seiko Epson Corporation (JP)

( * ) Notice: Subject to any disclaimer, the term of this patent is extended or adjusted under 35 U.S.C. 154(b) by 109 days.

(21) Appl. No.: 16/048,816

(22) Filed: Jul. 30, 2018

(65) Prior Publication Data

US 2019/0030724 A1   Jan. 31, 2019

(30) Foreign Application Priority Data

Jul. 31, 2017   (JP) ................................ 2017-147578

(51) Int. Cl.
| | | |
|---|---|---|
| *B25J 13/08* | (2006.01) | |
| *G01L 1/16* | (2006.01) | |
| *G01L 5/00* | (2006.01) | |
| *G01L 5/167* | (2020.01) | |

(52) U.S. Cl.
CPC ............... *B25J 13/085* (2013.01); *G01L 1/16* (2013.01); *G01L 5/009* (2013.01); *G01L 5/167* (2013.01)

(58) Field of Classification Search
CPC .. G01L 5/009; G01L 5/167; G01L 1/16; B23J 13/085
See application file for complete search history.

(56) References Cited

U.S. PATENT DOCUMENTS

| | | | | |
|---|---|---|---|---|
| 4,680,606 A | * | 7/1987 | Knutti ....................... | G01L 1/18 257/419 |
| 4,745,812 A | * | 5/1988 | Amazeen .................. | G01L 1/18 338/47 |
| 4,802,371 A | * | 2/1989 | Calderara ................. | G01L 1/16 310/338 |
| 6,612,143 B1 | * | 9/2003 | Butscher .................. | A61C 7/04 72/21.4 |
| 9,091,607 B2 | * | 7/2015 | Matsumoto ............ | B25J 19/028 |
| 9,127,996 B2 | * | 9/2015 | Kawai .................... | B25J 13/085 |
| 9,481,089 B2 | * | 11/2016 | Matsuzawa ............ | B25J 9/1694 |
| 10,044,295 B2 | * | 8/2018 | Kamijo ................. | H02N 2/0075 |
| 10,097,111 B2 | * | 10/2018 | Miyazawa ................. | B25J 9/12 |

(Continued)

FOREIGN PATENT DOCUMENTS

| | | |
|---|---|---|
| JP | 2015-001384 A | 1/2015 |
| JP | 2016-223827 A | 12/2016 |

*Primary Examiner* — Jonathan M Dunlap
(74) *Attorney, Agent, or Firm* — Harness, Dickey & Pierce, P.L.C.

(57) ABSTRACT

A force detection apparatus includes a first plate, a second plate, a first member projecting from the first plate toward the second plate, a second member projecting from the second plate toward the first plate, a third member projecting from the second plate toward the first plate, a first sensor device provided between the first member and the second member and having a piezoelectric element that outputs a signal according to an external force, and a second sensor device provided between the first member and the third member and having a piezoelectric element that outputs a signal according to an external force, wherein the first member has a first projection in contact with the first sensor device, a second projection in contact with the second sensor device, and a slit or a plurality of through holes between the first projection and the second projection.

17 Claims, 11 Drawing Sheets

(56) References Cited

U.S. PATENT DOCUMENTS

| | | | | |
|---|---|---|---|---|
| 10,147,866 B2* | 12/2018 | Miyazawa | ................ | B25J 17/00 |
| 10,179,405 B2* | 1/2019 | Miyazawa | ............. | H02N 2/004 |
| 2013/0112010 A1* | 5/2013 | Matsumoto | ............ | B25J 19/028 |
| | | | | 73/862.044 |
| 2013/0233089 A1* | 9/2013 | Kawai | .................... | B25J 13/085 |
| | | | | 73/862.68 |
| 2014/0366646 A1 | 12/2014 | Matsuzawa et al. | | |
| 2015/0120051 A1* | 4/2015 | Matsuzawa | ......... | H01L 41/1132 |
| | | | | 700/258 |
| 2015/0239126 A1* | 8/2015 | Matsuzawa | ............ | B25J 9/1694 |
| | | | | 700/258 |
| 2016/0109311 A1* | 4/2016 | Inazumi | .................. | G01L 5/167 |
| | | | | 73/862.042 |
| 2017/0021504 A1* | 1/2017 | Matsuzawa | ............ | B25J 9/1694 |
| 2018/0283966 A1* | 10/2018 | Matsuzawa | ............ | B25J 13/085 |

* cited by examiner

FORCE DETECTION APPARATUS AND ROBOT

BACKGROUND

1. Technical Field

The present invention relates to a force detection apparatus and robot.

2. Related Art

In related art, in industrial robots having robot arms with end effectors attached thereto, force detection apparatuses that detect forces applied to the end effectors are used. As an example of the force detection apparatuses, e.g. a force detection apparatus that detects an external force using the piezoelectric effect is known (for example, see Patent Document 1 (JP-A-2016-223827)).

The force detection apparatus disclosed in Patent Document 1 has a first base part, a second base part placed to be opposed to the first base part, and four sensor devices placed between the first base part and the second base part and detecting external forces using the piezoelectric effect. Specifically, the first base part has a top plate and four wall portions fixed to the top plate by screws, and the second base part has a bottom plate and four convex portions fixed to the bottom plate by screws. Each of the four sensor devices is individually supported by the single wall portion and the single convex portion, and the respective sensor devices detect the forces transmitted via the corresponding wall portions and convex portions. Further, the force detection apparatus detects an external force based on the forces applied to the four sensor devices.

Further, recently, reduction in size and weight of the force detection apparatus has been desired. For example, in the force detection apparatus disclosed in Patent Document 1, it is considered that the four convex portions are integrated, thereby, the placement space of the structure of the integrated four convex portions may be reduced and the number of screws for fixing the convex portions may be reduced, and thus, reduction in size and weight of the force detection apparatus may be realized.

However, in this case, rigidity of the structure is higher compared to that of the wall portions, and the stress distribution in the sensor devices is biased. Accordingly, there is a problem that other axis output (output in axis directions in which no force is applied) is larger and external force detection accuracy is lower than that in related art. Thus, downsizing while keeping the external force detection accuracy is difficult.

SUMMARY

An advantage of some aspects of the invention is to solve at least a part of the problems described above, and the invention can be implemented by the following application examples or embodiments.

A force detection apparatus according to an application example includes a first plate, a second plate opposed to the first plate, a first member projecting from the first plate toward the second plate, a second member placed to be opposed to the first member and projecting from the second plate toward the first plate, a third member placed to be opposed to the first member in a position different from that of the second member and projecting from the second plate toward the first plate, a first sensor device provided between the first member and the second member and having a piezoelectric element that outputs a signal according to an external force, and a second sensor device provided between the first member and the third member and having a piezoelectric element that outputs a signal according to an external force, wherein the first member has a slit or a plurality of through holes between a part in contact with the first sensor device and a part in contact with the second sensor device.

According to the force detection apparatus, the first member is provided, and thereby, downsizing of the force detection apparatus may be realized. Further, bias of a stress distribution in the first sensor device and bias of a stress distribution in the second sensor device may be reduced, and thus, other axis output may be reduced or eliminated. Accordingly, lowering of external force detection accuracy may be reduced.

In the force detection apparatus according to the application example, it is preferable that the first member has a frame shape.

With this configuration, downsizing of the force detection apparatus may be realized particularly effectively.

In the force detection apparatus according to the application example, it is preferable that the part in contact with the first sensor device and the part in contact with the second sensor device are respectively placed in an outer periphery of the first member.

With this configuration, the first sensor device, the second sensor device, and other various components (e.g. a circuit board etc.) may be efficiently placed, and thus, downsizing of the force detection apparatus may be realized more effectively.

In the force detection apparatus according to the application example, it is preferable that the slit or the plurality of through holes are provided on the second plate side of the first member in first directions as directions in which the first plate and the second plate overlap.

With this configuration, the bias of the stress distribution in the first sensor device and the bias of the stress distribution in the second sensor device may be reduced more effectively, and thus, the lowering of the external force detection accuracy may be further reduced.

In the force detection apparatus according to the application example, it is preferable that an end on the first plate side of the part in contact with the first sensor device and an end on the first plate side of the part in contact with the second sensor device are respectively located closer to the first plate side than the end on the first plate side of the slit or the plurality of through holes in first directions as directions in which the first plate and the second plate overlap.

With this configuration, the bias of the stress distribution in the first sensor device and the bias of the stress distribution in the second sensor device may be reduced more effectively. Note that the end on the first plate side of the plurality of through holes refers to the end on the first plate side of the through hole located closest to the first plate side.

In the force detection apparatus according to the application example, it is preferable that an adjustment part that adjusts a size of the slit or the plurality of through holes is provided in the slit or the plurality of through holes.

With this configuration, the size of the slit or the plurality of through holes may be adjusted, and thus, the other axis output may be made closer to zero.

In the force detection apparatus according to the application example, it is preferable that the adjustment part is adapted so that a drive source that generates power for moving the adjustment part to adjust the size of the slit or the plurality of through holes may be connected.

With this configuration, the size of the slit or the plurality of through holes may be automatically adjusted by driving of a drive source such as a motor, for example.

In the force detection apparatus according to the application example, it is preferable that the first member and the first plate are integrally formed.

With this configuration, fixing members such as screws for fixing the first member to the first plate may be omitted, and weight reduction of the force detection apparatus may be realized.

A robot according to an application example includes a base, an arm connected to the base, and the force detection apparatus according to the application example connected to the arm.

According to the robot, the force detection apparatus of the application example is provided, and thereby, more precise work may be executed.

In the robot according to the application example, it is preferable that an end effector having a holding part that can hold an object is attached to the force detection apparatus, and the holding part is provided in a position off a center axis of the force detection apparatus.

Even in the case where the end effector having the configuration in which an external force is applied to the position off the center axis of the force detection apparatus is used, the robot may execute more precise work.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of a force detection apparatus and robot will be explained in detail based on the accompanying drawings. The respective drawings contain parts enlarged or reduced as appropriate and parts omitted so that the parts to be explained can be recognized. Further, in this specification, "connection" includes direct connection and indirect connection via an arbitrary member.

1. Robot

First, an example of a robot of the application example will be explained.

Figure 1:
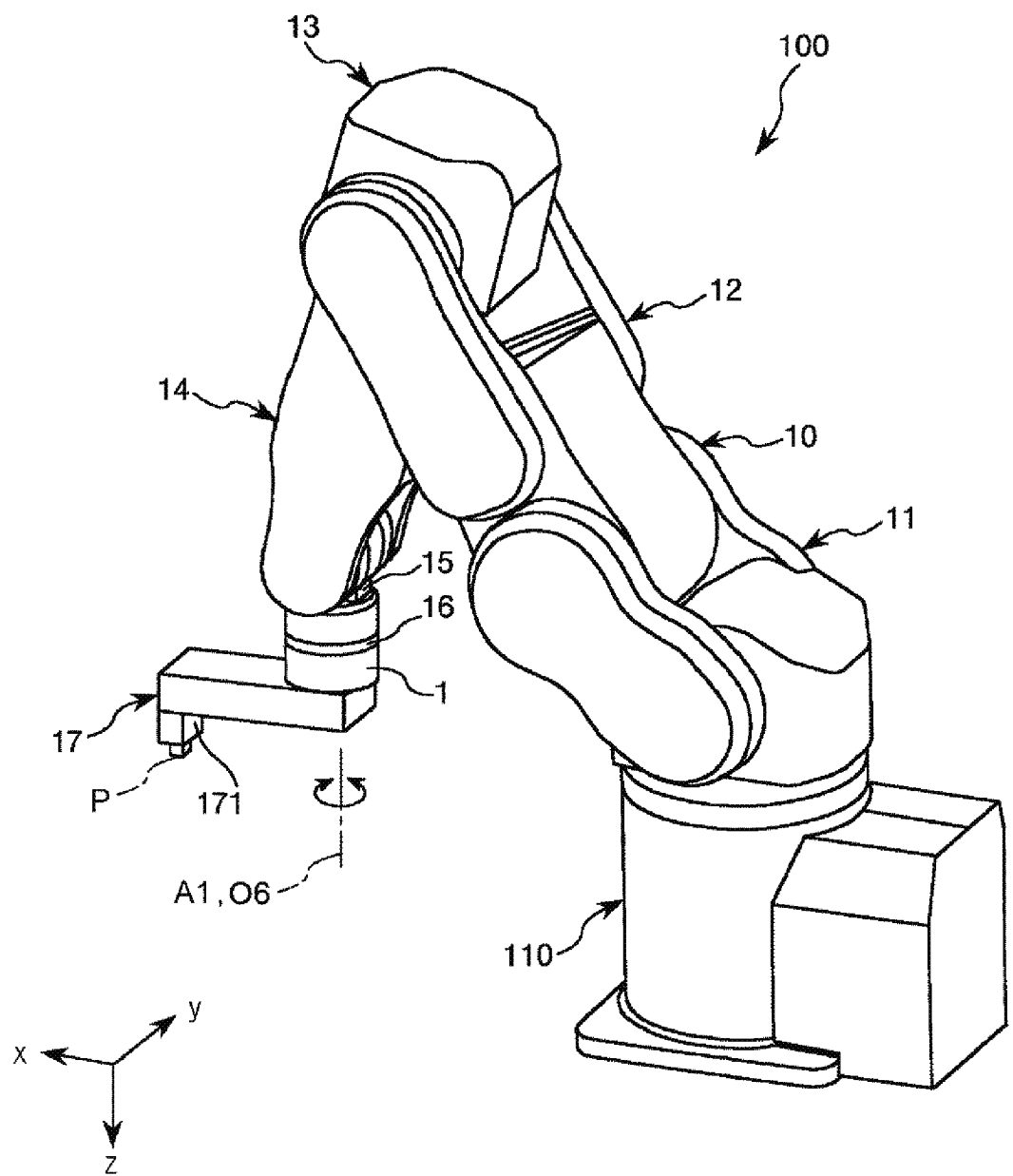
FIG. 1 is a perspective view showing an example of a robot.

FIG. 1 is a perspective view showing an example of a robot. Note that the side of a base 110 in FIG. 1 is referred to as "proximal end" and the opposite side (the side of an end effector 17) is referred to as "distal end". Further, in FIG. 1, an x-axis, y-axis, and z-axis are shown as three axes orthogonal to one another and the tip end sides of arrows showing the respective axes are "+" and the tail end sides are "−". Furthermore, directions parallel to the x-axis are referred to as "x-axis directions", directions parallel to the y-axis are referred to as "y-axis directions", and directions parallel to the z-axis are referred to as "z-axis directions".

A robot 100 shown in FIG. 1 may perform work of feeding, removing, carrying, assembly, etc. of objects including precision apparatuses and components forming the apparatuses. The robot 100 is the so-called single-arm six-axis vertical articulated robot. Further, driving of the robot 100 is controlled by a robot controller (control apparatus, not shown) including a processor. Note that the robot 100 may be separately provided from the robot controller or may contain the robot controller as long as the robot can communicate with the robot controller.

The robot 100 has the base 110 and a robot arm 10 rotatably coupled to the base 110. Further, a force detection apparatus 1 is connected to the robot arm 10 and the end effector 17 is connected to the force detection apparatus 1.

The base 110 is a part fixed to e.g. a floor, wall, ceiling, movable platform, or the like. Note that the base 110 itself may be movable as long as the robot arm 10 is connected to the base 110. The robot arm 10 has an arm 11 (first arm), an arm 12 (second arm), an arm 13 (third arm), an arm 14 (fourth arm), an arm 15 (fifth arm), and an arm 16 (sixth arm). These arms 11 to 16 are sequentially coupled from the proximal end side toward the distal end side. The respective arms 11 to 16 are rotatable with respect to the adjacent arms or base 110. Note that, as shown in FIG. 1, the arm 16 has a disc shape and rotatable about a rotation axis O6 with respect to the arm 15.

The force detection apparatus 1 is detachably provided between the arm 16 and the end effector 17. The force detection apparatus 1 detects forces (including moment) applied to the end effector 17. The force detection apparatus 1 will be described later in detail.

The end effector 17 is a tool for performing work on an object (not shown) as a work object of the robot 100 and has a holding part (fingers) 171 that holds the object. Further, the end effector 17 is eccentric with respect to the arm 16 and the force detection apparatus 1. Specifically, a work point P of the end effector 17, i.e., a point at which the end effector directly performs work on the object or the like is off the rotation axis O6 of the arm 16 and a center axis A1 of the force detection apparatus 1 concentric with the rotation axis.

In the arm 16 and the end effector 17, attachment members (not shown) for detachable attachment of the force detection apparatus 1 are respectively provided. The configuration of the attachment members is not particularly limited. For example, a configuration having female screws or male screws used for attachment of the force detection apparatus 1 to the arm 16 or end effector 17 by screwing, bolting, or the like or a configuration having an engagement portion such as a hook or L-shaped groove may be employed. Thereby, the force detection apparatus 1 may be easily attached to an appropriate position. Accordingly, external force detection accuracy by the force detection apparatus 1 may be made higher.

The robot 100 has drive units (not shown) including motors that rotate one arm with respect to the other arm (or base 110). Further, the robot 100 has angle sensors (not shown) that detect rotation angles of the rotation shafts of the motors. The drive units and the angle sensors are provided in e.g. the respective arms 11 to 16. The drive units and the angle sensors can communicate with the robot controller (not shown).

The robot 100 includes the base 110, the arm 16 (robot arm 10) connected to the base 110, and the force detection apparatus 1 connected to the arm 16. According to the robot 100, feedback control is performed based on the external force (detection result) detected by the force detection apparatus 1, and thereby, more precise work may be executed. Further, the robot 100 may sense contact of the end effector 17 with an obstacle or the like based on the detection result by the force detection apparatus 1. Accordingly, an obstacle avoidance action, object damage avoidance action, etc. may be easily performed, and the robot 100 may execute work more safely.

As described above, the end effector 17 having the holding part 171 that can hold an object is attached to the force detection apparatus 1, and the holding part 171 is provided in the position off the center axis A1 of the force detection apparatus 1.

Even in the case where the end effector 17 having the configuration in which the external force is applied to the position off the center axis A1 of the force detection apparatus 1, the force detection apparatus 1 may exert the effects as will be described later, and the robot 100 may execute more precise work.

As above, the robot 100 is explained. Note that, in the drawings, "end effector" includes any configuration as long as the end effector may hold (including grasping or suctioning) the object, but is not limited to the illustrated configuration. Further, "end effector" is not necessarily eccentric with respect to the force detection apparatus 1.

2. Force Detection Apparatus

Next, an example of the force detection apparatus of the application example will be explained.

First Embodiment

Figure 2:
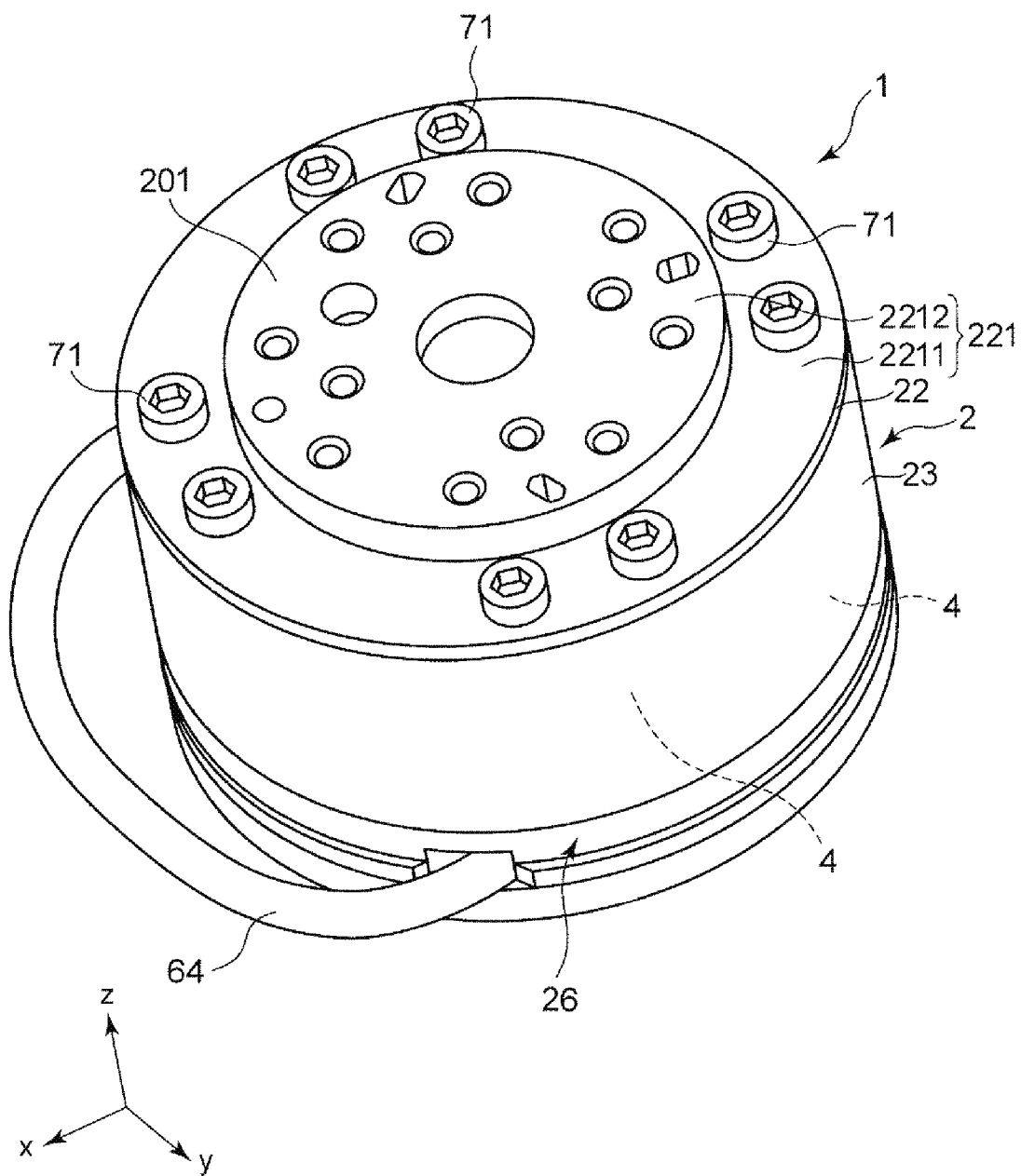
FIG. 2 is a perspective view of a force detection apparatus according to the first embodiment.
Figure 3:
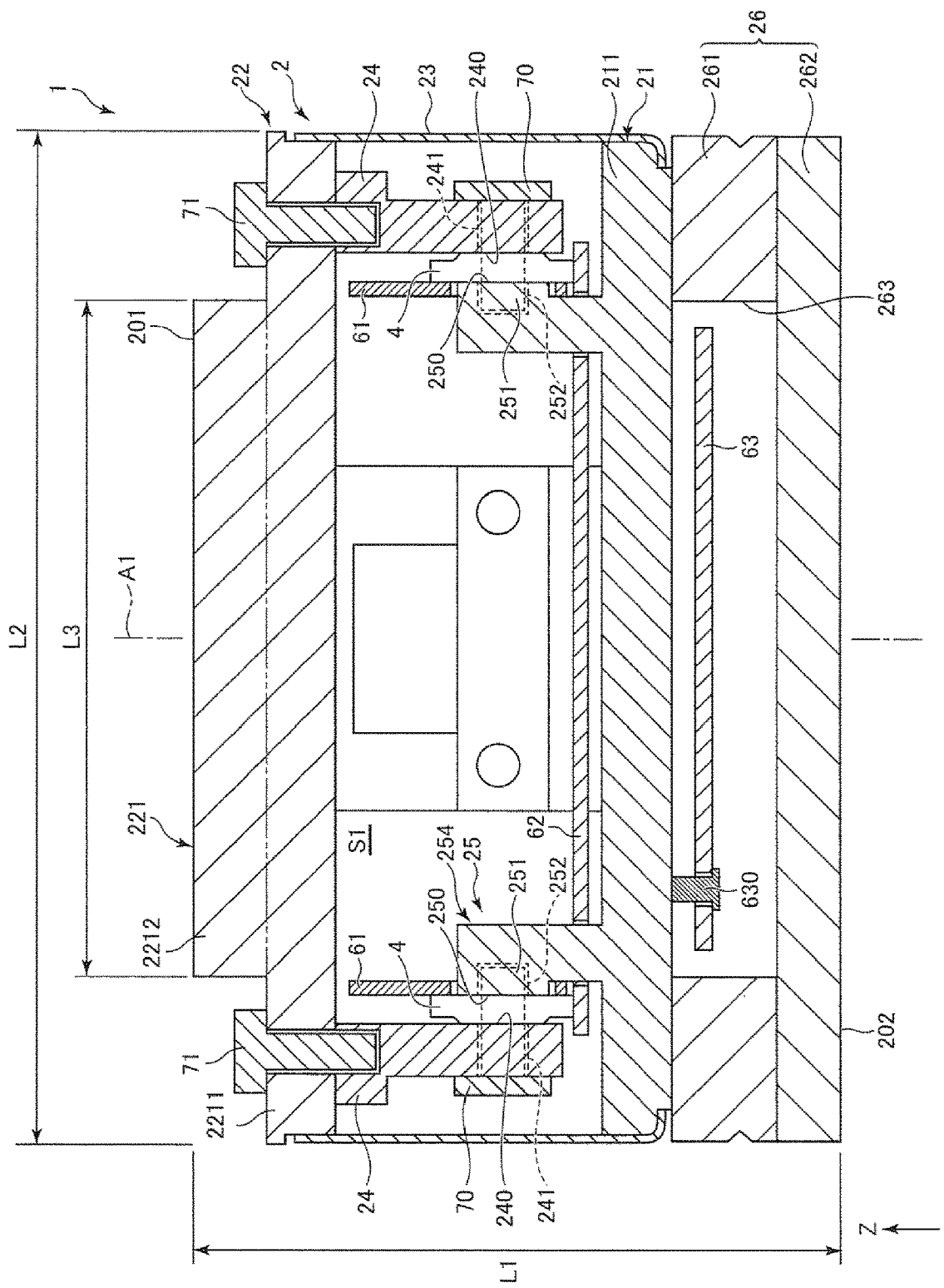
FIG. 3 is a longitudinal sectional view of the force detection apparatus shown in FIG. 2.
Figure 4:
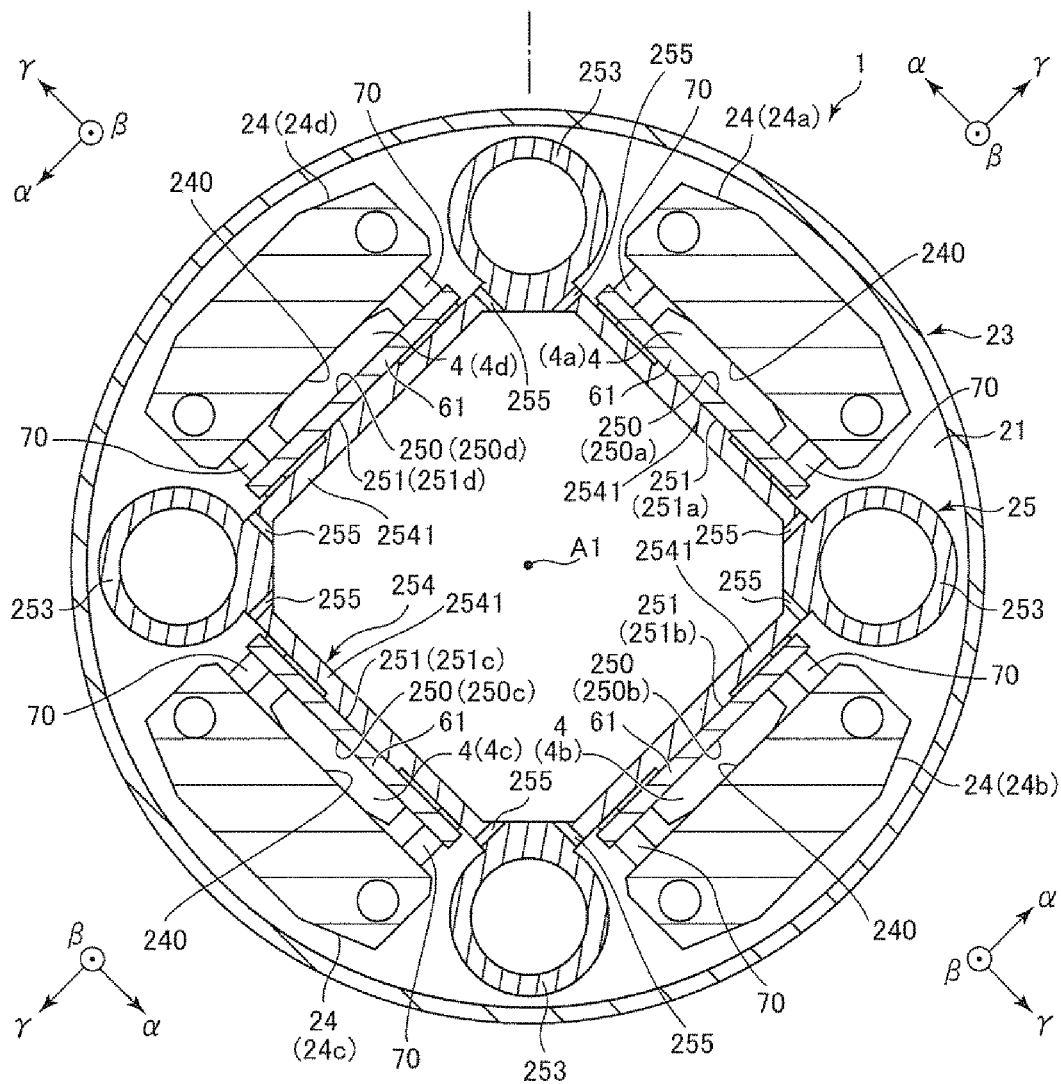
FIG. 4 is a plan view showing inside of the force detection apparatus shown in FIG. 2.
Figure 5:
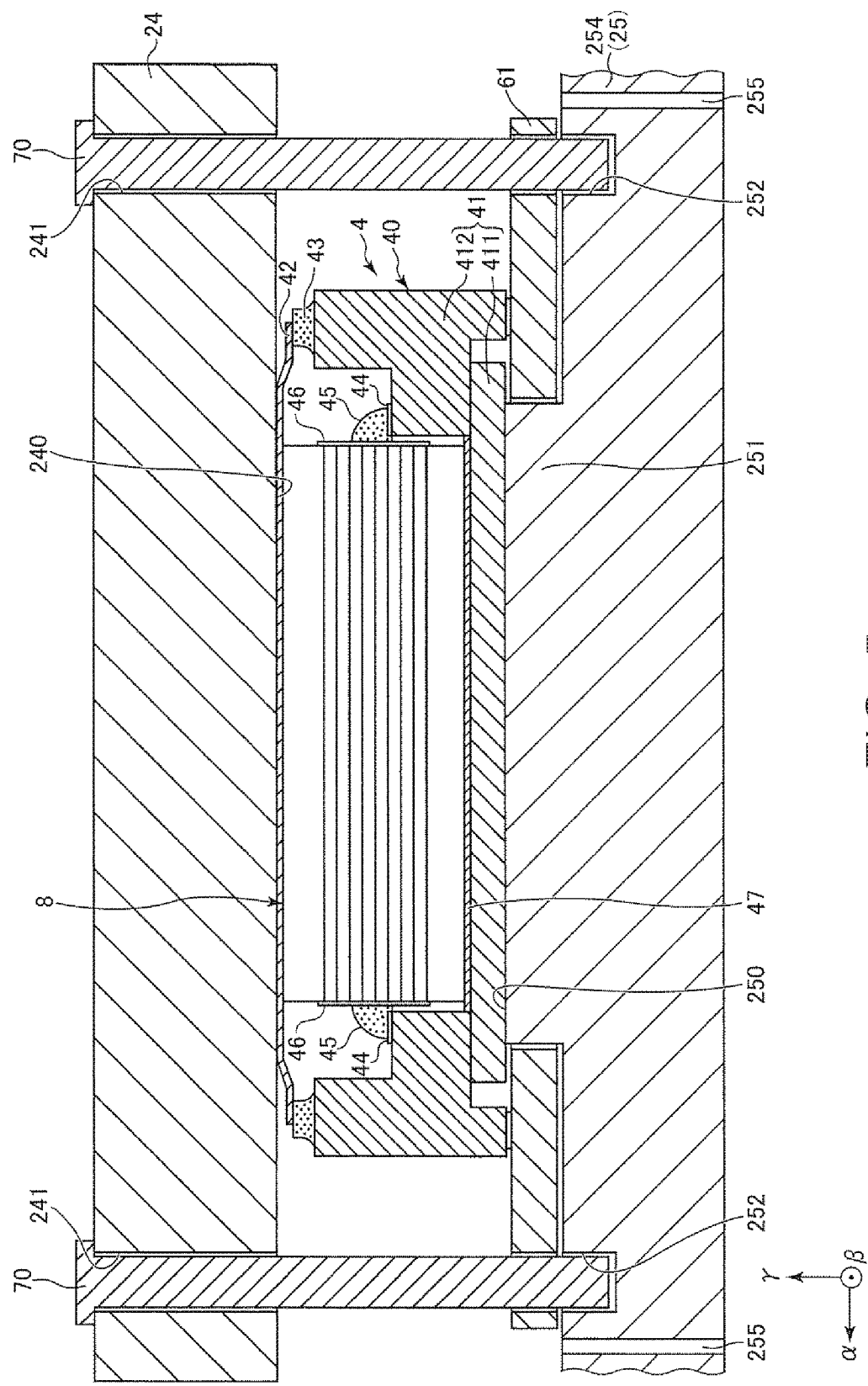
FIG. 5 is a sectional view showing a sensor device of the force detection apparatus shown in FIG. 2.
Figure 6:
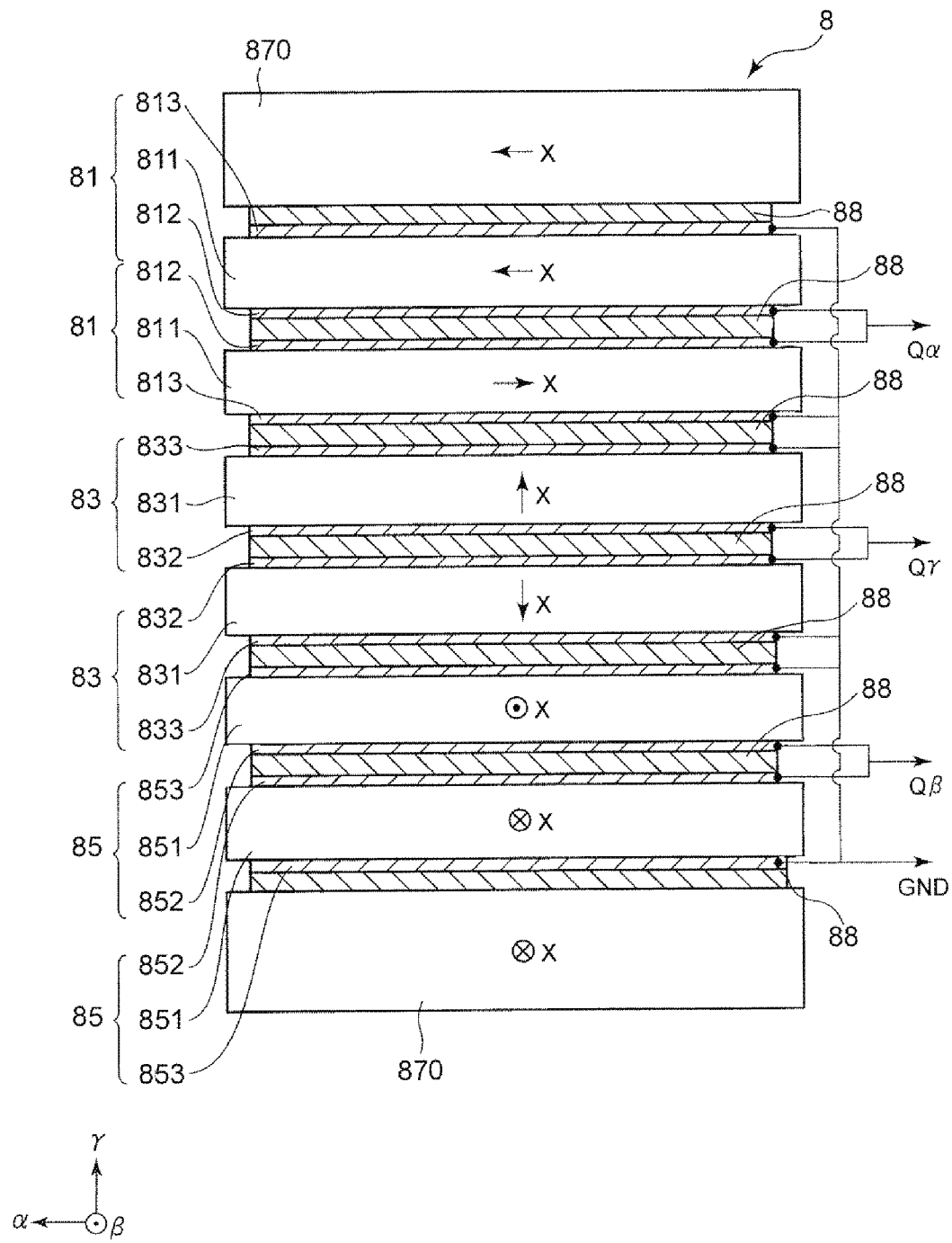
FIG. 6 is a sectional view showing a force detection element of the sensor device shown in FIG. 5.

FIG. 2 is a perspective view of the force detection apparatus according to the first embodiment. FIG. 3 is a longitudinal sectional view of the force detection apparatus shown in FIG. 2. FIG. 4 is a plan view showing inside of the force detection apparatus shown in FIG. 2. FIG. 5 is a sectional view showing a sensor device of the force detection apparatus shown in FIG. 2. FIG. 6 is a sectional view showing a force detection element of the sensor device shown in FIG. 5. Note that, in FIG. 4, a digital circuit board 62 is not shown.

The force detection apparatus 1 shown in FIGS. 2 to 4 is the six-axis force sensor that can detect six axis components of an external force applied to the force detection apparatus 1. Here, the six axis components include translational force (shear force) components in the respective directions of the three axes orthogonal to one another (in the drawings, the x-axis, y-axis, and z-axis) and rotational force (moment) components about the respective three axes.

The force detection apparatus 1 has a case 2, a connection member 26 connected to the case 2, a plurality of sensor devices 4 housed within the case 2, a plurality of analog circuit boards 61, the single digital circuit board 62, and a relay board 63 housed in the connection member 26. Note that the outer shape of the force detection apparatus 1 as seen from the z-axis direction is a circular shape as shown in FIG. 2, however, includes, but is not limited to, e.g. a polygonal shape such as a quadrangular shape or pentagonal shape, an elliptical shape, or the like.

In the force detection apparatus 1, the respective sensor devices 4 output signals (detection results) according to the applied external forces and the signals are processed by the analog circuit boards 61 and the digital circuit board 62. Thereby, the six axis components of the external force applied to the force detection apparatus 1 are detected. Further, the signals processed by the digital circuit board 62 are externally output via the relay board 63 electrically connected to the digital circuit board 62.

As below, the respective parts of the force detection apparatus 1 will be explained.

Case

As shown in FIG. 3, the case 2 has a first case member 21, a second case member 22 placed apart from the first case member 21, and a side wall part 23 (third case member) provided in the outer peripheral parts of the first case member 21 and the second case member 22. The surface on the +z-axis side of the second case member 22 forms an attachment surface 201 to which the end effector 17 is attached (see FIGS. 1 and 2).

First Case Member

The first case member 21 shown in FIG. 3 has a first plate 211 in a circular plate shape, and a first member 25 stood in the outer peripheral part of the surface on the +z-axis side of the first plate 211.

As shown in FIG. 4, the first member 25 has a frame part 254 having a nearly square frame shape and a plurality of circular cylindrical parts 253 having circular cylindrical shapes provided in the corner portions of the frame part 254.

On four outer surfaces of the outer peripheral surface of the frame part 254, projecting parts 251 projecting toward outside are respectively provided. Top surfaces 250 of the projecting parts 251 are in contact with the sensor devices 4. In the following explanation, of the four projecting parts 251, the projecting part 251 located on the upper right side in FIG. 4 is referred to as "projecting part (first projection) 251a", and subsequently clockwise, the projecting parts are referred to as "projecting part (second projection) 251b", "projecting part 251c", and "projecting part 251d". When the respective projecting parts 251a, 251b, 251c, 251d are not distinguished, they are referred to as "projecting parts 251". Similarly, of the four top surfaces 250, the top surface 250 on the upper right side in FIG. 4 is referred to as "top surface 250a", and subsequently clockwise, the top surfaces are referred to as "top surface 250b", "top surface 250c", and "top surface 250d". When the respective top surfaces 250a, 250b, 250c, 250d are not distinguished, they are referred to as "top surfaces 250".

Further, in the frame part 254, a plurality of female screw holes 252 that can be screwed together with the tip end portions of the pressurization bolts 70 are formed around the respective projecting parts 251 (see FIGS. 3 to 5). In the embodiment, two female screw holes 252 are formed for each projecting part 251.

Although details are not shown, on inner wall surfaces of the circular cylindrical parts 253, female screws through which screws used for fixing the first case member 21 to the connection member 26, which will be described later, are inserted are formed (see FIGS. 3 and 4).

The first case member 21, particularly the first member 25 will be described later in detail.

Second Case Member

The second case member 22 has a second plate 221 in a plate shape placed to be opposed to the first plate 211, and a plurality of (four in the embodiment) supporting members 24 stood in the outer peripheral part of the surface of the second plate 221 on the −z-axis side (see FIGS. 3 and 4). The respective supporting members 24 are fixed to the second plate 221 by screws 71. In the following explanation, of the four supporting members 24, the supporting member 24 on the upper right side in FIG. 4 is referred to as "supporting member 24a (second member)", and subsequently clockwise, the supporting members are referred to as "supporting member 24b (third member)", "supporting member 24c (fourth member)", and "supporting member 24d (fifth member)". When the respective supporting members 24a, 24b, 24c, 24d are not distinguished, they are referred to as "supporting members 24".

As shown in FIG. 3, the second plate 221 has a base part 2211 in a plate shape and a convex part 2212 provided in the center portion of the base part on the +z-axis side, and the parts are integrally formed. Note that the convex part 2212 may be omitted. Further, as shown in FIG. 4, the four supporting members 24 are arranged at equal angular (90°) intervals from each other along the same circumference around the center axis A1 of the force detection apparatus 1. The respective supporting members 24 are placed on the outer periphery side of the frame part 254 of the above described first member 25 to be opposed to the respective outer surfaces of the frame part 254. The respective supporting members 24 have inner wall surfaces 240 located on the frame part 254 side and the respective inner wall surfaces 240 face the above described top surfaces 250 at a distance at which the sensor devices 4 can be inserted.

In the respective supporting members 24, a plurality of through holes 241 through which the pressurization bolts 70 can be inserted are formed (see FIGS. 3 to 5). The respective through holes 241 are provided in correspondence with the above described female screw holes 252, and two of the pressurization bolts 70 are provided on both sides of each sensor device 4. Thereby, the sensor devices 4 are in contact with the respective supporting members 24 and first member 25 and sandwiched by the supporting members 24 and the first member 25 with pressurization. The fastening forces of the pressurization bolts 70 are appropriately adjusted, and thereby, pressure with predetermined magnitude may be applied to the sensor devices 4 as pressurization. The constituent material of the respective pressurization bolts 70 includes, but is not particularly limited to, e.g. various metal materials.

Side Wall Part

The side wall part 23 has a circular cylindrical shape and is fitted with the respective first plate 211 and second plate 221 (see FIGS. 3 and 4). Thereby, the first case member 21, the second case member 22, and the side wall part 23 form an air-tight internal space S1 housing the plurality of sensor devices 4.

Connection Member

The connection member 26 shown in FIG. 3 includes a circular cylindrical member 261 having a hole 263 penetrating in the center portion and a member 262 having a circular plate shape connected to the member 261. The surface of the member 261 on the +z-axis side is connected to the first plate 211, and the relay board 63 is placed in the hole 263. Further, the surface of the connection member 26 on the −z-axis side forms an attachment surface 202 to which the arm 16 is attached (see FIGS. 1 and 3).

The respective constituent materials of the above described first case member 21, second case member 22, side wall part 23, and connection member 26 include, but are not particularly limited to, e.g. metal materials such as aluminum and stainless steel, ceramics, etc. All of the members may be formed using the same or same kind of material or different materials from one another.

Analog Circuit Board

As shown in FIG. 4, the plurality of (four in the embodiment) analog circuit boards 61 are provided within the case 2. In the embodiment, one analog circuit board 61 is provided for each sensor device 4 and the single sensor device 4 and the corresponding single analog circuit board 61 are electrically connected. The analog circuit board 61 is provided between the supporting member 24 and the first member 25, and inserted through the projecting part 251 and placed on the center axis A1 side with respect to the sensor device 4 (see FIGS. 3 and 4).

The analog circuit board 61 includes charge amplifiers (conversion and output circuits, not shown) that respectively convert electric charge Q (Qα, Qβ, Qγ) output from the sensor device 4 to be described later into voltages V (Vα, Vβ, Vγ). The charge amplifier may include e.g. an operation amplifier, a capacitor, and a switching element.

Digital Circuit Board

As shown in FIG. 3, the digital circuit board 62 is provided within the case 2. In the embodiment, the digital circuit board 62 is placed above the first plate 211. The digital circuit board 62 is electrically connected to the respective analog circuit boards 61.

The digital circuit board 62 includes an external force detection circuit (not shown) that detects (calculates) an external force based on the voltages V from the analog circuit boards 61. The external force detection circuit calculates translational force components Fx in the x-axis directions, translational force components Fy in the y-axis directions, translational force components Fz in the z-axis directions, rotational force components Mx about the x-axis, rotational force components My about the y-axis, and rotational force components Mz about the z-axis. The external force detection circuit may include e.g. an AD converter and an arithmetic circuit such as a CPU connected to the AD converter.

Relay Board

As shown in FIG. 3, the relay board 63 placed within the connection member 26 is fixed to the first case member 21 by e.g. a bolt 630. The relay board 63 is electrically connected to the digital circuit board 62 by wiring (not shown) including e.g. a flexible board. Further, the relay board 63 is connected to an external wire 64 (see FIG. 2) provided outside of the force detection apparatus 1 and the external wire 64 is connected to the robot controller (not shown).

Sensor Device

As shown in FIG. 4, the four sensor devices 4 are placed to be symmetric with respect to a line segment CL passing through the center axis A1 and parallel to the y-axis as seen from the z-axis direction. The four sensor devices 4 have the same configuration except that the positions within the case 2 are different. The respective sensor devices 4 have functions of detecting external forces applied along three axes of an α-axis, β-axis, and γ-axis orthogonal to one another. In the following explanation, of the four sensor devices 4, the sensor device 4 located on the upper right side in FIG. 4 is referred to as "first sensor device 4a", and subsequently clockwise, the sensor devices are referred to as "second sensor device 4b", "third sensor device 4c", and "fourth sensor device 4d". When the first sensor device 4a, the second sensor device 4b, the third sensor device 4c, and the fourth sensor device 4d are not distinguished, they are referred to as "sensor devices 4".

As shown in FIG. 5, each sensor device 4 has a force detection element 8 and a package 40 housing the force detection element 8. Note that the sensor device 4 is mounted on the above described analog circuit board 61.

Package

As shown in FIG. 5, the package 40 has a base part 41 having a concave part in which the force detection element 8 is placed and a lid member 42 joined to the base part 41 via a sealing 43 to close the opening of the concave part.

The base part 41 has a bottom member 411 in a plate shape and a side wall member 412 in a rectangular frame shape joined (fixed) to the bottom member 411. The force detection element 8 is connected to the bottom member 411 via an adhesive member 47 formed using e.g. an adhesive agent having an insulation property. The lid member 42 is in direct contact with the force detection element 8. As the specific constituent materials of the base part 41 and the lid member 42, e.g. various metal materials including stainless steel and kovar, various ceramics, etc. may be used.

Force Detection Element

The force detection element 8 (stacked structure) shown in FIG. 6 has two piezoelectric elements 81 that output the electric charge $Q\alpha$ according to the external force (shear force) parallel to the $\alpha$-axis, two piezoelectric elements 83 that output the electric charge $Q\gamma$ according to the external force (compression/tensile force) parallel to the $\gamma$-axis, and two piezoelectric elements 85 that output the electric charge $Q\beta$ according to the external force (shear force) parallel to the $\beta$-axis, two supporting boards 870, and a plurality of connecting portions 88, and these are stacked as shown in the drawing.

Piezoelectric Element

As shown in FIG. 6, each of the two piezoelectric elements 81 has a ground electrode layer 813 electrically connected to the reference potential (e.g. ground potential GND), a piezoelectric material layer 811, and an output electrode layer 812. The two piezoelectric elements 81 are placed so that the respective output electrode layers 812 may be connected via the connecting portions 88 to each other. Further, each of the two piezoelectric elements 83 has a ground electrode layer 833, a piezoelectric material layer 831, and an output electrode layer 832. The two piezoelectric elements 83 are placed so that the respective output electrode layers 832 may be connected via the connecting portions 88 to each other. Further, each of the two piezoelectric elements 85 has a ground electrode layer 853, a piezoelectric material layer 851, and an output electrode layer 852. Further, the two piezoelectric elements 85 are placed so that the respective output electrode layers 852 may be connected via the connecting portions 88 to each other.

Figure 8:
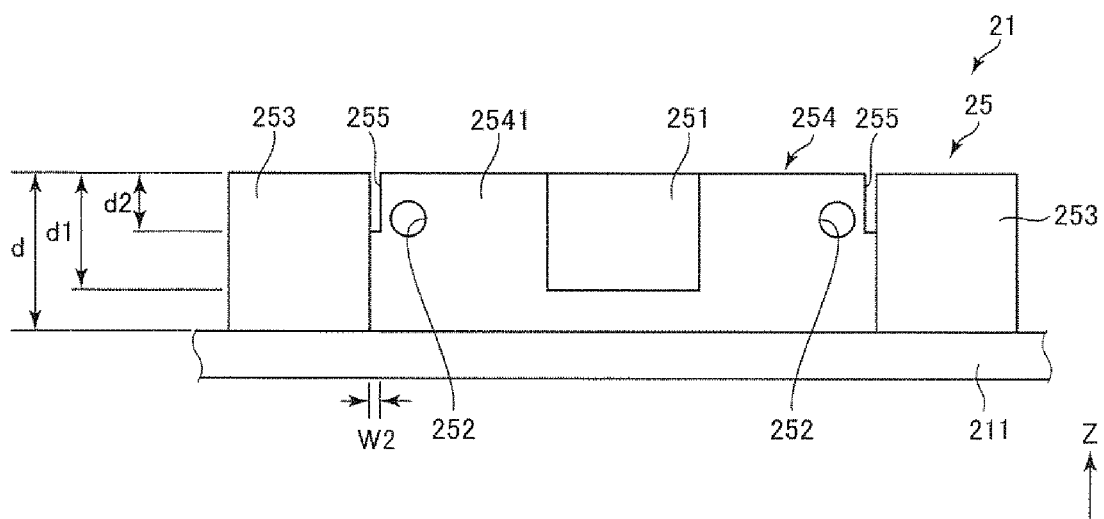
FIG. 8 shows a part of the first case member shown in FIG. 7.

The respective piezoelectric material layers 811, 831, 851 are formed using crystal quartz. Thereby, the force detection apparatus 1 having better characteristics such as higher sensitivity, wider dynamic range, and higher rigidity may be realized. Further, as shown in FIG. 8, the piezoelectric material layers 811, 831, 851 are placed so that the directions of the X-axes as crystal axes of the crystal quartz may be different from one another. Specifically, the respective piezoelectric material layers 811 are formed by Y cut quartz crystal plates and placed so that the directions of the X-axes may be different by 180° from each other. Similarly, the respective piezoelectric material layers 851 are formed by Y cut quartz crystal plates and placed so that the directions of the X-axes may be different by 180° from each other. Further, the piezoelectric material layers 811 and the piezoelectric material layers 851 are placed so that the directions of the X-axes may be different by 90° from each other. The respective piezoelectric material layers 831 are formed by X cut quartz crystal plates and placed so that the directions of the X-axes may be different by 180° from each other.

Note that, in the embodiment, the respective piezoelectric material layers 811, 831, 851 are formed using crystal quartz, however, the layers may have configurations using other piezoelectric materials than crystal quartz. The other piezoelectric materials than crystal quartz include e.g. topaz, barium titanate, lead titanate, lead zirconate titanate (PZT: Pb (Zr, Ti)O$_3$), lithium niobate, and lithium tantalate.

The respective output electrode layers 812, 832, 852 and the respective ground electrode layers 813, 833, 853 are electrically connected to side electrodes 46 provided on the side surfaces of the force detection element 8 (see FIGS. 5 and 6). Further, these output electrode layers 812, 832, 852 are electrically connected to the analog circuit board 61 via conducting connecting portions 45 formed using e.g. Ag paste or the like connected to the side electrodes 46, a plurality of internal terminals 44 provided in the package 40, and interconnections (not shown) formed in the base part 41.

The materials forming the respective output electrode layers 812, 832, 852 and the respective ground electrode layers 813, 833, 853 are not particularly limited as long as the materials may function as electrodes, but include e.g. nickel, gold, titanium, aluminum, copper, iron, chromium, or alloys containing the metals. One of them may be used or two or more of them may be combined (stacked, for example) for use.

Supporting Board

The respective supporting boards 870 support the piezoelectric elements 81, 83, 85, and the thicknesses of the respective supporting boards 870 are larger than the thicknesses of the respective piezoelectric material layers 811, 831, 851. Further, the respective supporting boards 870 are formed using quartz crystal. One supporting board 870 is formed by a quartz crystal plate (Y cut quartz crystal plate) having the same configuration as the piezoelectric material layer 811 of the adjacent piezoelectric element 81, and has the same direction of the X-axis as the piezoelectric material layer 811. Further, the other supporting board 870 is formed by a quartz crystal plate (Y cut quartz crystal plate) having the same configuration as the piezoelectric material layer 851 of the adjacent piezoelectric element 85, and has the same direction of the X-axis as the piezoelectric material layer 851. Here, the quartz crystal has anisotropy, and thus, the coefficients of thermal expansion are different in directions of the X-axis, Y-axis, and Z-axis as the crystal axes. Accordingly, as shown in the drawing, it is preferable that the respective supporting boards 870 have the same configurations and placements (the directions of the X-axes) as the adjacent piezoelectric material layers 811, 851 for suppressing forces due to thermal expansion. Note that the respective supporting boards 870 may be formed using other materials than quartz crystal like the respective piezoelectric material layers 811, 831, 851.

Connecting Portion

The connecting portions 88 are formed using an insulating material and have a function of blocking conduction between the respective piezoelectric elements 81, 83, 85. For the respective connecting portions 88, e.g., silicone, epoxy, acryl, cyanoacrylate, polyurethane adhesive agents may be used.

As above, the force detection element 8 is explained. As described above, when the three axes orthogonal to one another are the α-axis, the β-axis, and the γ-axis, the force detection element 8 has the piezoelectric elements 83 (first piezoelectric elements) including the piezoelectric material layers 831 formed by the X cut crystal quartz and outputting the electric charge Qγ according to the external forces along the γ-axis directions. Further, the force detection element 8 has the piezoelectric elements 81 (second piezoelectric elements) including the piezoelectric material layers 811 formed by the Y cut crystal quartz and outputting the electric charge Qα according to the external forces in the α-axis directions. Furthermore, the force detection element 8 has the piezoelectric elements 85 (third piezoelectric elements) including the piezoelectric material layers 851 formed by the Y cut crystal quartz, placed to sandwich the piezoelectric elements 83 between the piezoelectric elements 81 and themselves, and outputting the electric charge Qβ according to the external forces in the β-axis directions. Thereby, the applied external force may be decomposed and detected using the anisotropy of the piezoelectric effect depending on the crystal orientation of the quartz crystal. That is, the translational force components of the three axes orthogonal to one another may be independently detected.

As described above, the force detection element 8 includes the plurality of (two or more) piezoelectric elements 81, 83, 85, and thereby, the number of detection axes may be made larger. Further, the force detection element 8 may independently detect the translational force components of the three axes orthogonal to one another only if the element has at least one of each of the piezoelectric elements 81, 83, 85 (first to third piezoelectric elements), however, the output sensitivity may be made higher when the element has two of each of the piezoelectric elements 81, 83, 85 (first to third piezoelectric elements) as is the case of the embodiment.

Note that the order of stacking of the respective piezoelectric elements 81, 83, 85 is not limited to that shown in the drawing. Further, the number of piezoelectric elements forming the force detection element 8 is not limited to the above described number. For example, the number of piezoelectric elements may be one to five, seven, or more.

As above, the basic configuration of the force detection apparatus 1 is explained. Next, the above described first case member 21 will be described in detail.

First Case Member

Figure 7:
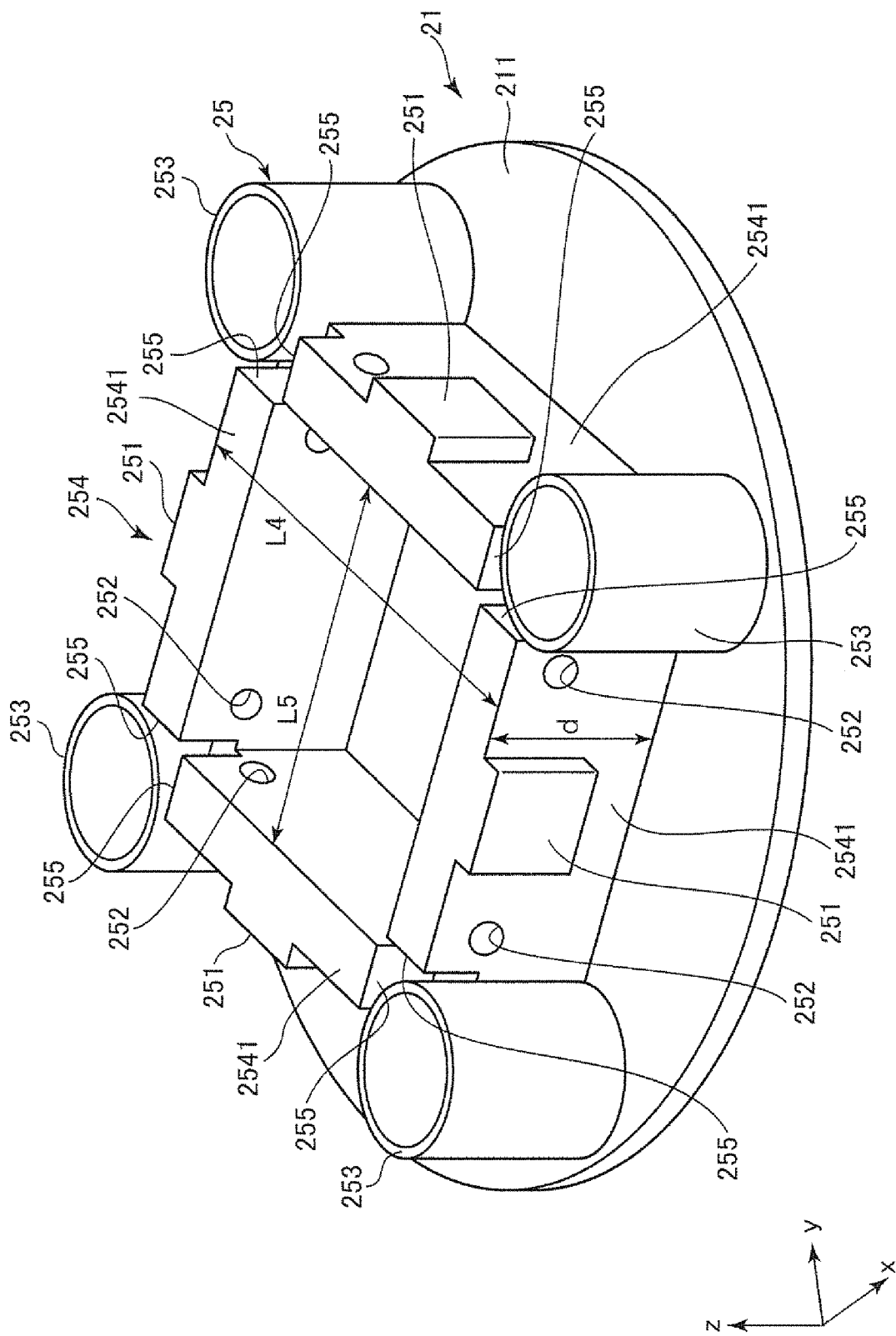
FIG. 7 is a perspective view showing a first case member shown in FIG. 3.
Figure 9:
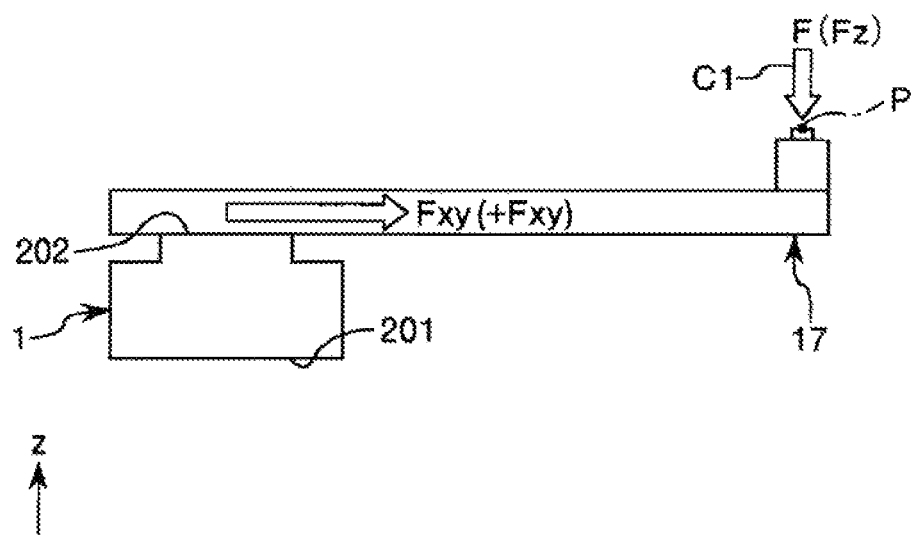
FIG. 9 is a side view schematically showing a state in which an end effector is attached to the force detection apparatus.

FIG. 7 is a perspective view showing the first case member shown in FIG. 3. FIG. 8 shows a part of the first case member shown in FIG. 7. FIG. 9 is a side view schematically showing a state in which the end effector is attached to the force detection apparatus.

As described above, the first case member 21 has the first plate 211 and the first member 25 (see FIGS. 4 and 7). Further, in the embodiment, the first member 25 and the first plate 211 are integrally formed.

The first member 25 has the frame part 254 in the frame shape and the four circular cylindrical parts 253. The frame part 254 has a nearly square shape as seen from the z-axis direction and is formed by four wall portions 2541. Further, the frame part 254 has the four projecting parts 251 and the two female screw holes 252. Two of the holes are provided in correspondence with each projecting part 251. One projecting part 251 is provided for each wall portion 2541.

Further, the projecting part 251 is located in the center part of the outer surface of the wall portion 2541 closer to the +z-axis.

As described above, the first member 25 having the frame part 254 like the integration of the four wall portions 2541 is used, and thereby, compared to the case where the four wall portions 2541 are individual, that is, a configuration of individually supporting the sensor devices 4 in related art, the placement space of the first member 25 may be made smaller and downsizing of the force detection apparatus 1 may be realized.

The frame part 254 has a plurality of (eight in the embodiment) slits 255 in the respective corner portions, i.e., boundary portions between the circular cylindrical parts 253 and the frame part 254. Two of the slits 255 are provided for each wall portion 2541. The slits 255 are located on the opposite sides (outside) of the female screw holes 252 to the sensor device 4 as seen from a direction along the perpendicular of the top surface 250 of the projecting part 251. Further, the slits 255 open to the surface on the opposite side of the wall portion 2541 to the first plate 211 (the surface on the +z-axis side) and the outer surface and the inner surface of the wall portion 2541. As shown in FIG. 8, a length d2 of the slit 255 along the z-axis directions is shorter than a length d1 of the projecting part 251 along the z-axis directions. A width W2 of the slit 255 (the length of the wall portion 2541 in the longitudinal direction) may be a width with which the inner surfaces of the slits 255 do not come into contact with each other when the frame part 254 deforms by the action of an external force F.

The slits 255 fulfill the function of reducing the other axis output by the force detection apparatus 1 (output in the axis direction in which no force is actually applied). That is, the slits 255 function as other axis output reduction parts. Here, as shown in FIG. 9, for example, when an object comes into contact with the end effector 17 and an external force F in a direction of an arrow C1 is applied to the work point P, the force detection apparatus 1 detects rotational force components Mx, My (Mxy) with a translational force component Fz. In this case, in the force detection apparatus 1, the first member 25 has the configuration like the integration of the four wall portions 2541 as described above, and thus, rigidity of the first member 25 is higher compared to that of the supporting members 24 and forces applied to the respective sensor devices 4 are deflected. That is, the stress distributions in the respective sensor devices 4 are biased. Accordingly, if the four wall portions 2541 are simply integrated, translational force components Fx, Fy (Fxy) not actually applied to the respective sensor devices 4 are detected as other axis output and, as a result, external force detection accuracy becomes lower. Thus, in the embodiment, as described above, the plurality of slits 255 that function as the other axis output reduction parts are provided in the first member 25. Note that a method of equalizing the rigidity of the supporting members 24 to that of the first member 25 by increasing the size or weight of the supporting members 24 is conceivable, however, it may be impossible to realize reduction in size and weight of the force detection apparatus 1 by the method.

As below, the relationship between the slit depth and the other axis output will be explained.

Figure 10:
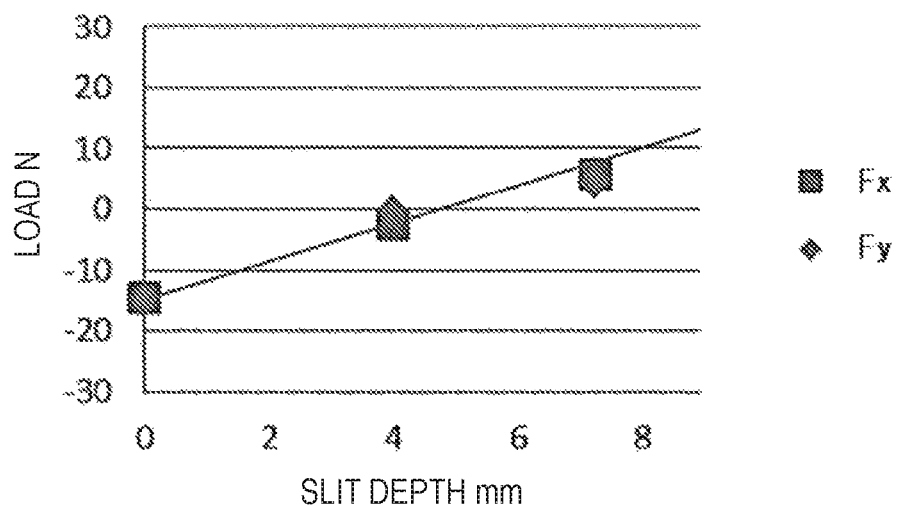
FIG. 10 is a graph showing a relationship between slit depth and other axis output.

FIG. 10 is a graph showing a relationship between the slit depth and the other axis output.

The graph shown in FIG. 10 shows the translational force components Fx, Fy as other axis output when the external force F in the arrow C1 direction is applied to the work point P as shown in FIG. 9. Note that the graph shown in FIG. 10 shows a simulation result when the force detection apparatus 1 having the size as below is used. That is, a height L1 of the force detection apparatus 1 is 29 mm, a diameter L2 of the base part 2211 is 59.8 mm, a diameter L3 of the convex part 2212 is 34 mm, an outer width L4 of the frame part 254 except the projecting parts 251 as seen from the z-axis direction is 30.8 mm, an inner width L5 of the frame part 254 as seen from the z-axis direction is 22.8 mm, a height d of the frame part 254 is 11.25 mm, and the thickness of the projecting parts 251 is 1 mm (see FIGS. 3 and 7). Further, the graph in FIG. 10 shows the translational force components Fx, Fy (load [N]) when the length d2 (depth [mm]) of the respective slits 255 along the z-axis directions in the first member 25 shown in FIG. 8 is changed in a range from 0 to 12 mm from the surface on the +z-axis side as the start point (zero).

As shown in FIG. 10, it is known that the translational force components Fx, Fy change when the length d2 of the slits 255 is changed. It is also known that the slits 255 are provided, and thereby, compared to the case without the slits, the translational force components Fx, Fy, i.e., the other axis output may be made smaller. Thus, the slits 255 are provided, and thereby, lowering of external force detection accuracy may be reduced.

Further, in the graph shown in FIG. 10, as the length d2 is closer to about 5 mm, the translational force components Fx, Fy are smaller. From the fact, the relationship between the length d2 of the slits 255 and the height d of the frame part 254 is not particularly limited, but preferably $0.2 \leq d2/d \leq 0.8$ and more preferably $0.3 \leq d2/d \leq 0.7$. Thereby, the other axis output may be made even smaller and the lowering of external force detection accuracy may be further reduced (see FIG. 8). The relationship between the length d2 of the slits 255 and the length d3 of the projecting parts 251 (the length as seen from the perpendicular direction of the top surfaces 250) is not particularly limited, but preferably $0.3 \leq d2/d3 \leq 0.7$ and more preferably $0.4 \leq d2/d3 \leq 0.6$. Thereby, the other axis output may be made even smaller.

As explained above, the force detection apparatus 1 has the first plate 211 and the second plate 221 opposed to the first plate 211 as described above. Further, the force detection apparatus 1 has the first member 25 projecting from the first plate 211 toward the second plate 221 side, the supporting member 24a (second member) placed to be opposed to the first member 25 and projecting from the second plate 221 toward the first plate 211 side, and the supporting member 24b (third member) placed to be opposed to the first member 25 in a position different from that of the supporting member 24a and projecting from the second plate 221 toward the first plate 211 side. Furthermore, the apparatus includes the first sensor device 4a provided between the first member 25 and the supporting member 24a and having the six (in the embodiment) piezoelectric elements 81, 83, 85 that output signals according to external forces, and the second sensor device 4b provided between the first member 25 and the supporting member 24b and having the six (in the embodiment) piezoelectric elements 81, 83, 85 that output signals according to external forces. The first member 25 has the slits 255 between the projecting part 251a (top surface 250a) as the part in contact with the first sensor device 4a and the projecting part 251b (top surface 250b) as the part in contact with the second sensor device 4b. The slits 255 are provided between the respective projecting parts 251.

According to the force detection apparatus 1, the first member 25 like the integration of the four wall portions 2541 is provided, thereby, the placement space of the first member 25 may be reduced, and thus, downsizing of the force detection apparatus 1 may be realized. Further, as described above, the slits 255 are provided, and thereby, the bias of the stress distributions in the respective sensor devices 4 may be reduced as described above. Accordingly, the other axis output may be reduced or eliminated, and thus, the lowering of external force detection accuracy may be reduced.

Note that the parts in contact with the respective sensor devices 4 are the projecting parts 251 (more specifically, the top surfaces 250 as the projecting surfaces of the wall portions 2541) in the embodiment, however, the parts in contact with the respective sensor devices 4 do not necessarily project from the wall portions 2541 or may be e.g. flat surfaces (for example, the wall portions 2541 without projecting parts).

As described above, the first member 25 has the frame shape. Particularly, in the embodiment, the first member 25 has the rectangular frame shape.

Thereby, the placement space of the first member 25 may be easily reduced, and downsizing of the whole force detection apparatus 1 may be realized particularly effectively. Further, the first member 25 has the frame part 254 including the wall portions 2541 in the same number as the number of sensor devices 4. Accordingly, the placement of the respective sensor devices 4 is easier.

Moreover, as described above, the projecting part 251a (top surface 250a) as the part in contact with the first sensor device 4a and the projecting part 251b (top surface 250b) as the part in contact with the second sensor device 4b are respectively placed in the outer periphery of the first member 25. Further, the projecting part 251c (top surface 250c) as the part in contact with the third sensor device 4c and the projecting part 251d (top surface 250d) as the part in contact with the fourth sensor device 4d are respectively placed in the outer periphery of the first member 25. Therefore, the sensor devices 4 are respectively placed in the outer periphery of the first member 25.

Thereby, the respective sensor devices 4 and other various components (e.g. the digital circuit board 62 etc.) may be efficiently placed, and thus, downsizing of the force detection apparatus 1 may be realized more effectively.

As shown in the drawings, the slits 255 are provided on the second plate 221 side of the first member 25 in first directions in which the first plate 211 and the second plate 221 overlap.

Thereby, compared to the case where the slits 255 are provided on the first plate 211 side of the first member 25, the bias of the stress distributions in the respective sensor devices 4 may be reduced more effectively. Accordingly, the other axis output may be reduced or eliminated, and thus, the lowering of external force detection accuracy may be further reduced.

In the first directions, the end on the first plate 211 side of the projecting part 251a (top surface 250a) as the part in contact with the first sensor device 4a and the end on the first plate 211 side of the projecting part 251b (top surface 250b) as the part in contact with the second sensor device 4b are respectively located closer to the first plate 211 side than the ends of the slits 255 on the first plate 211 side. Further, in the first directions, the end on the first plate 211 side of the projecting part 251c (top surface 250c) as the part in contact with the third sensor device 4c and the end on the first plate 211 side of the projecting part 251d (top surface 250d) as the part in contact with the fourth sensor device 4d are respectively located closer to the first plate 211 side than the ends of the slits 255 on the first plate 211 side.

Thereby, the bias of the stress distributions in the respective sensor devices 4 may be reduced more effectively and the other axis output may be made closer to zero.

As described above, the first member 25 and the first plate 211 are integrally formed.

Thereby, fixing members such as screws for fixing the first member 25 to the first plate 211 may be omitted. Accordingly, weight reduction of the force detection apparatus 1 may be realized.

Note that the first member 25 and the first plate 211 may be separately formed and joined to each other using an adhesive or the like.

Modified Example

Figure 11:
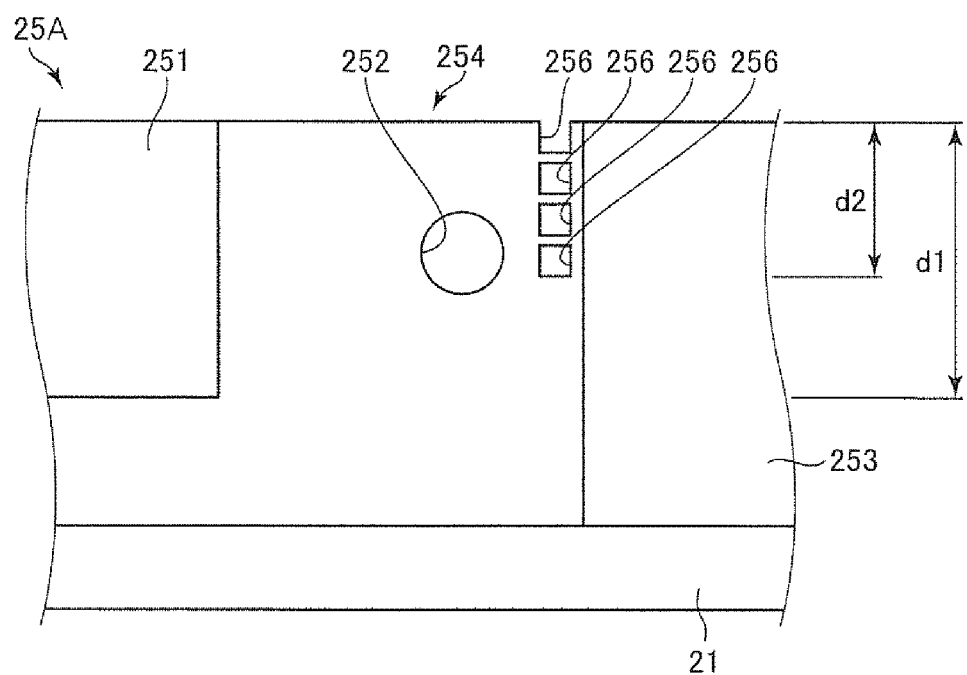
FIG. 11 shows a modified example of a first member.

FIG. 11 shows a modified example of the first member.

As shown in FIG. 11, a first member 25A has a plurality of through holes 256 in place of the slits 255. The plurality of through holes 256 are provided in the same positions as the positions in which the slits 255 are provided, and function as the other axis output reduction parts like the slits 255. Note that the shape, number, and placement of the through holes 256 are arbitrary, not limited to those shown in the drawing.

According to the first member 25A, the same advantages as those of the first member 25 are offered. That is, the first member 25A has the plurality of through holes 256 between the projecting part 251*a* (top surface 250*a*) as the part in contact with the first sensor device 4*a* and the projecting part 251*b* (top surface 250*b*) as the part in contact with the second sensor device 4*b* (see FIGS. 7, 8, and 11). Further, the plurality of through holes 256 (arranged in a line in the z-axis directions in the embodiment) are provided between the respective projecting parts 251 (respective top surfaces 250). According to the force detection apparatus 1 having the above described first member 25A, the bias of the stress distributions in the respective sensor devices 4 may be reduced. Accordingly, the other axis output may be reduced or eliminated, and thus, the lowering of external force detection accuracy may be reduced.

The plurality of through holes 256 are provided on the second plate 221 side (+z-axis side) of the first member 25 in the first directions in which the first plate 211 and the second plate 221 overlap. Thereby, compared to the case where the plurality of through holes 256 are provided on the first plate 211 side of the first member 25, the bias of the stress distributions in the respective sensor devices 4 may be reduced more effectively. Accordingly, the other axis output may be reduced or eliminated, and thus, the lowering of external force detection accuracy may be further reduced.

In the first directions, the end on the first plate 211 side of the projecting part 251*a* (top surface 250*a*) as the part in contact with the first sensor device 4*a* and the end on the first plate 211 side of the projecting part 251*b* (top surface 250*b*) as the part in contact with the second sensor device 4*b* are respectively located closer to the first plate 211 side than the end of the plurality of through holes 256 on the first plate 211 side. Further, in the first directions, the end on the first plate 211 side of the projecting part 251*c* (top surface 250*c*) as the part in contact with the third sensor device 4*c* and the end on the first plate 211 side of the projecting part 251*d* (top surface 250*d*) as the part in contact with the fourth sensor device 4*d* are respectively located closer to the first plate 211 side than the end of the plurality of through holes 256 on the first plate 211 side. Thereby, as is the case of the first member 25 having the slits 255, the bias of the stress distributions in the respective sensor devices 4 may be reduced more effectively and the other axis output may be made closer to zero. Note that the end of the plurality of through holes 256 on the first plate 211 side refers to the end of the through hole 256 located closest to the first plate 211 side.

Note that the number of formed through holes 256, the shape, size, placement pattern, etc. are not particularly limited.

Second Embodiment

Next, the second embodiment will be explained.

Figure 12:
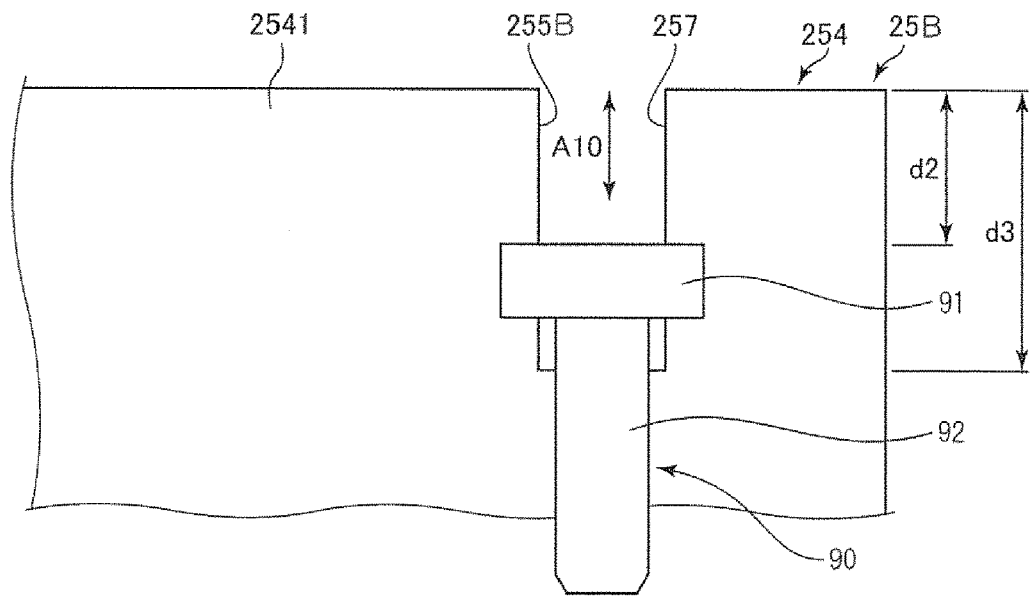
FIG. 12 schematically shows a part of a first member of a force detection apparatus according to the second embodiment.
Figure 13:
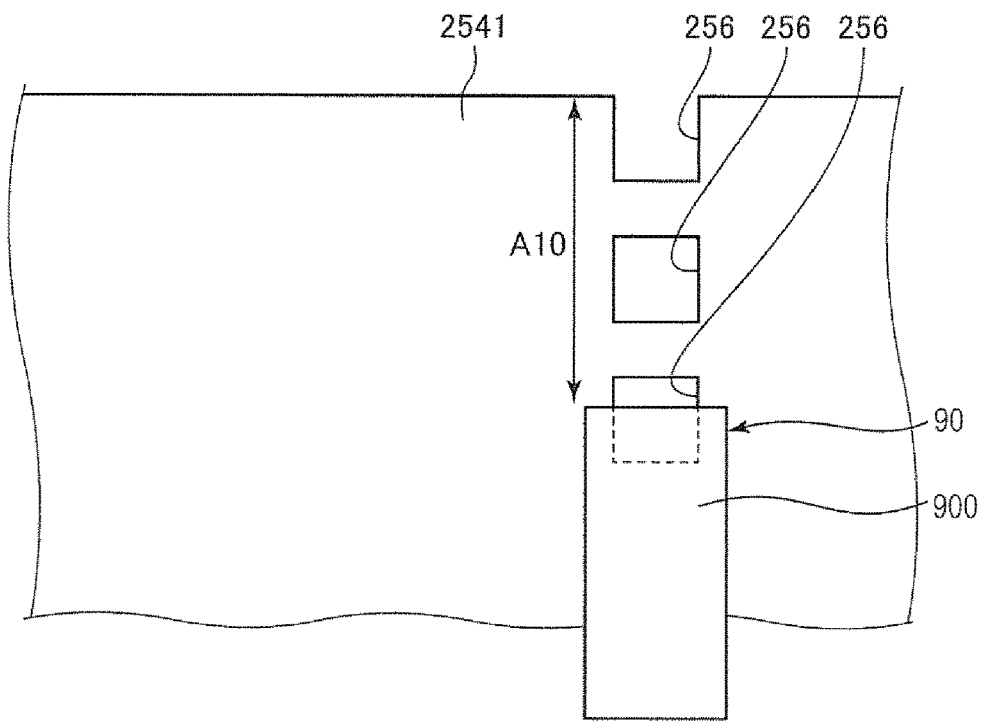
FIG. 13 schematically shows another example of an adjustment part.
Figure 14:
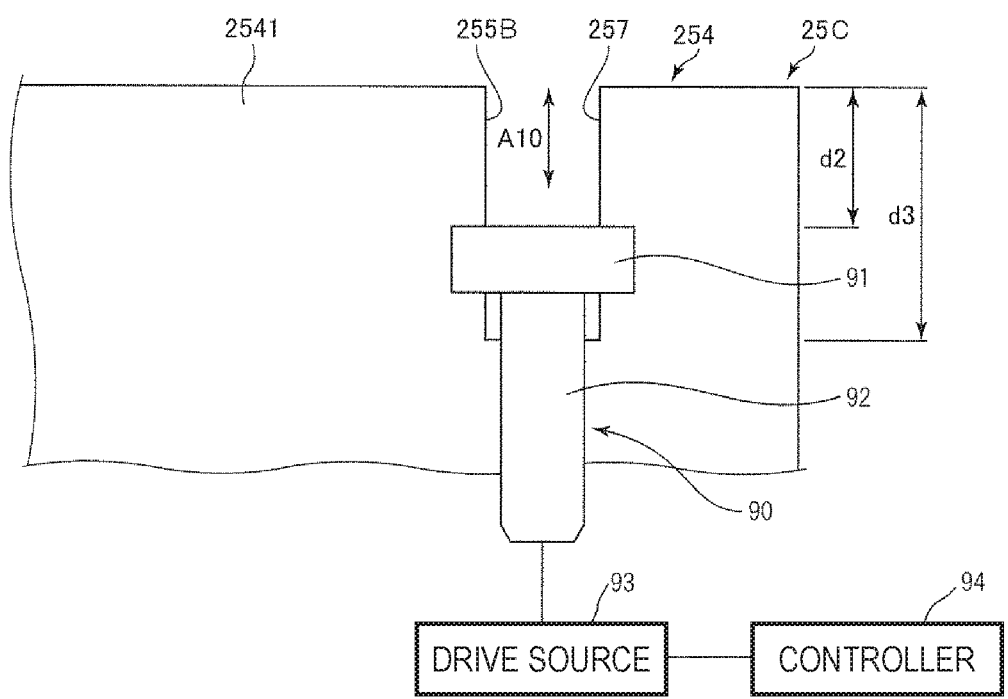
FIG. 14 schematically shows a modified example of the first member.

FIG. 12 schematically shows a part of a first member of a force detection apparatus according to the second embodiment. FIG. 13 schematically shows another example of an adjustment part. FIG. 14 schematically shows a modified example of the first member.

The embodiment is the same as the above described embodiment except that the configuration of the first member is different. In the following description, the second embodiment will be explained with a focus on the differences from the above described embodiment and the explanation of the same items will be omitted.

A slit 255B of a first member 25B shown in FIG. 12 is formed by adjustment of a length d3 (depth) of a slit 257 longer than a length d2 (depth) of the slit 255B. Therefore, the length of the slit 255B is variable.

In the slit 257, a screw 92 movable in directions of an arrow A10 and an adjustment member 91 connected to the +z-axis side of the screw 92 and moving with the movement of the screw 92 are provided. The adjustment member 91 is e.g. a plate-like member (plate) and fitted in an inner wall portion of the slit 257 slidably in the arrow A10 directions.

The screw 92 and the adjustment member 91 function as an adjustment part 90 that adjusts the length d2 (size) of the slit 255B. That is, in the slit 255B, the adjustment part 90 that adjusts the length d2 (size) of the slit 255B is provided.

Thereby, the length d2 of the slit 255B may be adjusted, and thus, the other axis output may be made closer to zero by adjustment of the length d2 of the slit 255B according to the magnitude of the detected other axis output. Therefore, the detection accuracy of the force detection apparatus 1 may be made higher. Further, individual differences of the other axis output of the force detection apparatus 1 may be reduced.

The adjustment part 90 can be used for the above described plurality of through holes 256. That is, the adjustment parts 90 that adjust the size (total size) of the plurality of through holes 256 may be provided for the plurality of through holes 256. For example, as the adjustment part 90, a configuration having a member 900 in a plate shape slidable with respect to the inner surface and the outer surface of the wall portion 2541 may be used (see FIG. 13). Thereby, the through holes 256 may be closed by the member 900 by movement of the member 900. Accordingly, the total size of the plurality of through holes 256 may be adjusted, and thus, the other axis output may be reduced easily and accurately. Note that the adjustment part is not limited to the configuration shown in the drawing as long as the part can adjust the total size of the plurality of through holes 256.

Modified Example

In a first member 25C shown in FIG. 14, a drive source 93 including e.g. a motor that generates drive power for moving the screw 92 is connected to the screw 92 of the adjustment part 90. Further, a controller 94 that controls the drive power of the drive source 93 is electrically connected to the drive source 93. The controller 94 includes e.g. a processor and a memory. Note that the controller 94 may be integrated with or separated from the robot controller (not shown).

For example, the controller 94 stores data on the relationship between the other axis output by the force detection apparatus 1 and the length d2 of the slit 255B as shown in the above described FIG. 10. Further, the controller 94 controls the drive power for the drive source 93 based on the data and the other axis output detected by the force detection apparatus 1. Thereby, the length d2 of the slit 255B may be automatically adjusted so that the other axis output may be zero or closer to zero.

As described above, in the first member 25C shown in FIG. 14, the adjustment part 90 (specifically, the screw 92) is adapted so that the drive source 93 that generates power for moving the adjustment part 90 (specifically, the screw 92) to adjust the length d2 (size) of the slit 255B may be connected.

Thereby, as described above, the length d2 (size) of the slit 255B may be automatically adjusted.

Although the details are not shown, the same applies to the member 900 as shown in FIG. 13. That is, the member 900 is adapted so that the drive source 93 that generates power for moving the member 900 to adjust the size (total size) of the plurality of through holes 256 may be connected. Thereby, the size of the plurality of through holes 256 may be automatically adjusted.

As above, the force detection apparatus and the robot according to the invention are explained based on the illustrated embodiments, however, the invention is not limited to those. The configurations of the respective parts may be replaced by arbitrary configurations having the same functions. Further, other arbitrary configurations may be added to the invention. Or, the respective embodiments may be appropriately combined.

In the above explanation, the pressurization bolts may be omitted as long as the sensor devices can be sandwiched by the first member and the supporting members.

Further, in the above explanation, the sensor device includes the package, however, does not necessarily include the package as long as the device includes at least one piezoelectric element. For example, the sensor device does not necessarily include the lid member of the package.

Furthermore, in the above explanation, the first member and the supporting members (second member, third member, fourth member, fifth member) are provided to be orthogonal to the first plate and the second plate, however, the members may be parallel to the plates or inclined.

The robot according to the invention is not limited to the six-axis vertical articulated robot. For example, the robot according to the invention may be a horizontal articulated robot or parallel link robot. Further, the robot according to the invention is not limited to the single-arm robot, but may be a dual-arm robot.

The number of arms of the single robot arm of the robot according to the invention may be one to five, seven, or more.

The force detection apparatus according to the invention can be incorporated in other apparatuses than the robots and may be mounted on e.g. vehicles such as automobiles.

The entire disclosure of Japanese Patent Application No. 2017-147578, filed Jul. 31, 2017 is expressly incorporated by reference herein.

What is claimed is:

1. A force detection apparatus comprising:
   a first plate;
   a second plate opposed to the first plate;
   a first member projecting from the first plate toward the second plate;
   a second member placed to be opposed to the first member and projecting from the second plate toward the first plate;
   a third member placed to be opposed to the first member in a position different from that of the second member and projecting from the second plate toward the first plate;
   a first sensor device provided between the first member and the second member and having a piezoelectric element that outputs a signal according to an external force; and
   a second sensor device provided between the first member and the third member and having a piezoelectric element that outputs a signal according to an external force,
   wherein the first member has a first projection in contact with the first sensor device, a second projection in contact with the second sensor device, and a slit or a plurality of through holes between the first projection and the second projection.

2. The force detection apparatus according to claim 1, wherein the first member has a frame shape.

3. The force detection apparatus according to claim 2, wherein the first projection and the second projection are respectively placed in an outer periphery of the first member.

4. The force detection apparatus according to claim 1, wherein the slit or the plurality of through holes are provided on the second plate side of the first member in first directions as directions in which the first plate and the second plate overlap.

5. The force detection apparatus according to claim 1, wherein an end on the first plate side of the first projection and an end on the first plate side of the second projection are respectively located closer to the first plate side than the end on the first plate side of the slit or the plurality of through holes in the first directions.

6. The force detection apparatus according to claim 1, further comprising a screw movable with respect to the slit and a plate connected to the screw.

7. The force detection apparatus according to claim 6, wherein the screw is adapted so that a drive source that generates power for moving the adjustment part to adjust the size of the slit or the plurality of through holes may be connected.

8. The force detection apparatus according to claim 1, wherein the first member and the first plate are integrally formed.

9. A robot comprising:
   a base;
   an arm connected to the base; and
   a force detection apparatus,
   wherein the force detection apparatus includes:
   a first plate;
   a second plate opposed to the first plate;
   a first member projecting from the first plate toward the second plate;
   a second member placed to be opposed to the first member and projecting from the second plate toward the first plate;
   a third member placed to be opposed to the first member in a position different from that of the second member and projecting from the second plate toward the first plate;

a first sensor device provided between the first member and the second member and having a piezoelectric element that outputs a signal according to an external force; and a second sensor device provided between the first member and the third member and having a piezoelectric element that outputs a signal according to an external force, and the first member has a first projection in contact with the first sensor device, a second projection in contact with the second sensor device, and a slit or a plurality of through holes between the first projection and the second projection.

10. The robot according to claim 9, wherein the first member has a frame shape.

11. The robot according to claim 10, wherein the first projection and the second projection are respectively placed in an outer periphery of the first member.

12. The robot according to claim 9, wherein the slit or the plurality of through holes are provided on the second plate side of the first member in first directions as directions in which the first plate and the second plate overlap.

13. The robot according to claim 9, wherein an end on the first plate side of the first projection and an end on the first plate side of the second projection are respectively located closer to the first plate side than the end on the first plate side of the slit or the plurality of through holes in the first directions.

14. The robot according to claim 9, further comprising a screw movable with respect to the slit and a plate connected to the screw.

15. The robot according to claim 14, wherein the screw is adapted so that a drive source that generates power for moving the adjustment part to adjust the size of the slit or the plurality of through holes may be connected.

16. The robot according to claim 9, wherein the first member and the first plate are integrally formed.

17. The robot according to claim 9, wherein an end effector having fingers that can hold an object is attached to the force detection apparatus, and the fingers are provided in a position off a center axis of the force detection apparatus.

* * * * *